March 23, 1954     L. BELLAVOINE     2,673,171
METHOD OF MAKING A COMPOSITE SOLE LEATHER AND PRODUCT
Filed May 10, 1951

INVENTOR
LEON BELLAVOINE
BY
Haseltine, Lake & Co
AGENTS

Patented Mar. 23, 1954

2,673,171

UNITED STATES PATENT OFFICE 2,673,171

METHOD OF MAKING A COMPOSITE SOLE LEATHER AND PRODUCT

Léon Bellavoine, Paris, France

Application May 10, 1951, Serial No. 225,606

Claims priority, application France March 2, 1951

5 Claims. (Cl. 154—125)

The present invention relates to composite leather sheets, and more particularly for making the soles of shoes.

The chief object of my invention is to make this composite leather sheet impervious to liquids such as water while being permeable to gaseous fluids such as air or vapors, which is particularly advantageous in the case of sole leather so as to prevent the passage of water and moisture from the outside while making it possible for air and vapors to escape therethrough.

My invention consists chiefly in constituting a composite leather with at least three layers of matter assembled together, to wit an external leather layer, intended to come into contact with moisture, preferably made of grain or hair side leather, an internal layer made of a flexible matter, preferably flesh side leather, and an intermediate layer between said two layers, made of a matter impervious to liquids and gases, and in providing in the internal layer a multiplicity of small cavities which extend through the intermediate layer and into the first mentioned external layer to a distance from the external face thereof.

A preferred embodiment of the present invention will be hereinafter described with reference to the accompanying drawing, given merely by way of example and in which.

Figure 1:
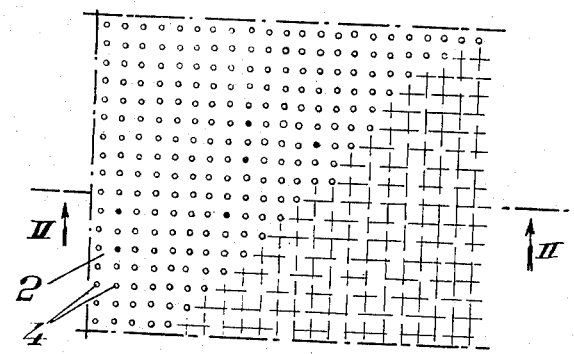
Fig. 1 shows, in bottom view, a composite leather made according to my invention.

The composite leather according to my invention is constituted by three layers, to wit an external layer 1 being intended to form the sole portion in contact with the ground and therefore with moisture, this layer 1 being made of ordinary leather or hair side leather, another layer 2, to be placed inside the shoe, made of a flexible material such as flesh or inner side leather, ersatz leather, cardboard or the like, and, finally, an intermediate layer 3 constituted by a material impervious to liquids and gases, for instance a sheet of an adhesive material insoluble in water, or a sheet of natural or artificial rubber composition.

These respective layers may be assembled together by glueing over their whole area or by glueing or stitching along their edges. In this last case, the edge of the sole is preferably coated with an impermeable product.

It will first be supposed that the starting material is an ordinary sole leather. In this case, this leather is slit, by means of a well known machine to obtain two sheets 1 and 2 of either equal or different thicknesses, sheet 1 corresponding to the grain or hair side of the leather and being intended to form the sole portion in contact with the ground, whereas sheet 2 is constituted by flesh or inner side leather to be fitted inside the shoe.

If necessary, the roughness of the faces of separation of these sheets is increased, for instance by means of a mechanical rasp. Then, at least one of these faces but preferably both are coated with a glue which, after hardening or drying, is impervious to liquids and gases or vapours.

For this purpose, I may use either a glue consisting chiefly of pure latex, or a cellulosic glue, that is to say an aqueous solution of cellulosic ethers such as methyl-cellulose, or again an aqueous emulsion of polyvinylic esters, such as polyvinyl acetate or chloride. Before applying sheets 1 and 2 upon each other, the glue is allowed to dry a little and, after juxtaposition of the two sheets, a glueing and impervious layer 3 is thus formed between them.

The whole is placed in a cold or hot press and, after treatment therein, it is advantageously subjected to beating by means of hammers for beating leather, as well known. Sheets 1 and 2 are then strongly glued together.

The whole is passed through a cylinder press or rolling mill one of the cylinders of which is fitted, over its whole area, with conical and radial points or projections very close to one another, for instance from 10 to 30 per square centimeter, the distances between these points being either equal or different and ranging from 1 to 5 millimeters. These points have a diameter at their base of about 2 mm. The length of each point is intermediate between the added thicknesses of flesh side leather layer 2 and impervious layer 3 and the total thickness of the composite layer.

The glued leather sheet is introduced into the rolling mill in such manner that the external face of flesh side leather 2 is in contact with the cylinder provided with points or projections, whereas the cylinder which is in contact with the outer face of grain leather 1 is smooth.

When passing between the cylinders of the rolling mill, the points carried by one of the cylinders pass through flesh leather sheet 2, glue layer 3 and into a portion of grain leather sheet 1 without passing throughout it.

Figure 2:
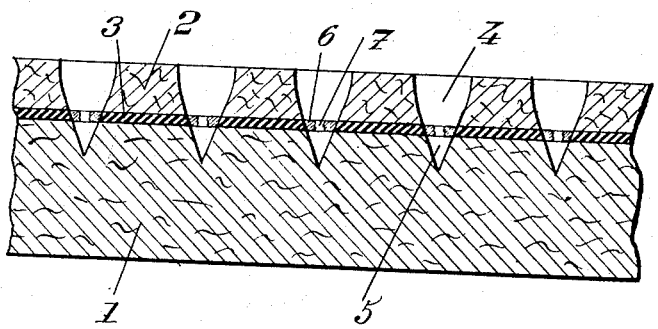
Fig. 2 shows, on a much larger scale and in cross section, a portion of this composite leather.

Every point, of conical shape, forms in flesh side leather sheet 2 a round hole 4 of very small diameter which after withdrawal of the point remains such as it was punched, as visible on Figs. 1 and 2. When this point engages into glue layer 3, it drills a hole therein and gradually expands said hole as it is driven in and penetrates into layer 1 to form a hole 5 therein.

When the point is withdrawn, the expanded edge of the hole made in layer 3 shrinks in owing to the natural elasticity of this layer and forms between holes 4 and 5 a kind of diaphragm 6 provided at its center with an extremely small hole 7 (of capillary size) which prevents passage of water and moisture from external sheet 1 toward internal sheet 2, but which forms a venting pore for air and vapor.

As this hole 7 does not communicate with the outside, since the hole 5 formed in the external sheet 1 is a blind hole, any danger of water or moisture passing through this microscopic hole is avoided.

In the preceding explanations, it was assumed that the composite leather was formed by two elementary sheets (grain and flesh side) obtained by slitting a thick leather. The same result is obtained when two sheets are applied against each other which do not come from the same initial leather. Besides, the number of these sheets may be higher than two provided that they are all perforated, together with the glue layer which is interposed between them, with the exception of the external sheet (grain leather) exposed to moisture.

I may also, according to my invention and as above stated, replace the glue layer 3 by a thin sheet of a material impervious to liquids and gases, such as a natural or artificial rubber composition, either glued to sheets 1 and 2 over its whole area by means of an adhesive substance insoluble in water or fixed to said sheets 1 and 2 by glueing and stitching along their peripheral edges.

The leather thus obtained is well adapted to make soles for shoes since it is impervious to moisture from the outside and permits venting of moisture from the inside of the shoe, contrary to what took place with rubber, crepe or analogous soles, or with soles constituted by leather sheets glued to one another through an impervious and continuous layer.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A composite sole leather which comprises, in combination, an external leather layer, an internal leather layer and a thin intermediate layer made of a flexible material impervious to liquids and gases, the internal layer being provided with a multiplicity of holes of general frusto-conical shape extending throughout it with the smaller cross-section of each of said holes on the intermediate layer, these three layers being juxtaposed and intimately secured together, the external layer being provided with a multiplicity of blind holes of general conical shape, continuing the first mentioned holes respectively and extending from the surface of contact of said external layer with the intermediate layer to a distance from the outer face of said external layer but little smaller than the thickness of said external layer, and the intermediate layer being provided with fine holes each in line with two corresponding holes of the two other layers, the cross-section of each of said intermediate layer holes being much smaller than the cross-section of each of the two holes in the two other layers with which it is in line, in the region of said intermediate layer.

2. A composite sole leather according to claim 1 in which the external layer is made of grain or hair side leather, the internal layer is made of flesh side leather and the intermediate layer is made of an elastic material.

3. A composite sole leather according to claim 2 in which the intermediate layer is made of a rubber composition.

4. A composite sole leather according to claim 2 in which the intermediate layer is made of a cellulosic glue.

5. A method of making a composite sole leather which comprises juxtaposing and securing together an external leather layer, an internal leather layer and an intermediate layer of a flexible material impervious to liquids, and boring the composite layer to form a multiplicity of substantially wedge-shaped holes extending through the internal and intermediate layers and into the external layer to a distance from the outer face thereof, the intermediate layer being made of an elasticity such that the holes formed therein retract to very small dimensions such that the liquids cannot flow therethrough.

LÉON BELLAVOINE.

References Cited in the file of this patent

UNITED STATES PATENTS

| Number | Name | Date |
|---|---|---|
| 1,309,461 | Cook | July 8, 1919 |
| 1,727,327 | Cady | Sept. 10, 1929 |
| 1,957,732 | Rowe | May 8, 1934 |
| 2,068,456 | Hooper | Jan. 19, 1937 |
| 2,294,654 | Cooper | Sept. 1, 1942 |